Oct. 25, 1960　　　H. K. GLEASMAN　　　2,957,560
SEMI-AUTOMATIC TWO-SPEED REAR HUB AND COASTER BRAKE
Filed April 30, 1959

WITNESS:

INVENTOR.
Hollis K. Gleasman
BY
ATTORNEY

United States Patent Office 2,957,560
Patented Oct. 25, 1960

2,957,560

SEMI-AUTOMATIC TWO-SPEED REAR HUB AND COASTER BRAKE

Hollis K. Gleasman, Elmira, N.Y., assignor to The Bendix Corporation, a corporation of Delaware Filed Apr. 30, 1959, Ser. No. 810,093

4 Claims. (Cl. 192—6)

The present invention relates to a semi-automatic two-speed rear hub and coaster brake for velocipedes and the like, and more particularly to a device of this type in which the change in gear ratio is brought about by arresting the rotation of the driving member and then pedalling forward.

The present invention is an improvement on the structure shown in application Serial Number 759,054, filed September 4, 1958, of which the present applicant is a co-inventor with Hood.

As set forth in the cited application, one of the problems encountered in developing a semi-automatic two-speed hub and brake is the tendency of the hub brake to jam when the vehicle is rolled backward. When the traversal of the clutch nut members is controlled by means of retarding members connected to the stationary axle as in the cited application and in the patent to Hood 2,865,478, issued December 23, 1958, this jamming of the brake is likely to occur when the wheel is rolled backward while in high gear.

Under such circumstances the backward rotation of the wheel hub is transmitted through the reduction gear to the low-speed screw shaft, and since the stationary retarder resists rotation of the low-speed cluch nut, it is traversed by its screw shaft, to apply the brake. The force exerted by the operator is augmented by the ratio between the radii of the tire and the hub, multiplied by the factor of the gear reduction. Consequently a comparatively small force such as might be exerted in rolling a bicycle back into a rack stand may jam the brake so firmly as to require dissasembly of the hub to unfreeze the parts. This, therefore, constitutes a serious problem.

In the above cited application, the problem is solved by restricting the travel of the low-speed clutch nut away from the high-speed nut. In the present case applicant has solved the problem by eliminating the stationary retarding member and substituting therefor a drag member which frictionally connects the low-speed clutch nut to the hub.

It is an object of the present invention to provide a novel semi-automatic two-speed hub and coaster brake which is efficient and reliable in operation and simple and economical in construction.

It is another object to provide such a device in which the shift in gear ratio is effected by coasting.

It is another object to provide such a device which may be wheeled freely forward or backward without undesired application of the brake.

It is another object to provide such a device incorporating threaded clutch members for rotating the hub, the engagement of which is controlled by means of a frictional connection to the hub rather than to a fixed axle.

Further objects and advantages will be apparent from the following description taken in connection with the accompanying drawing in which.

Figures 1, 2, 3:
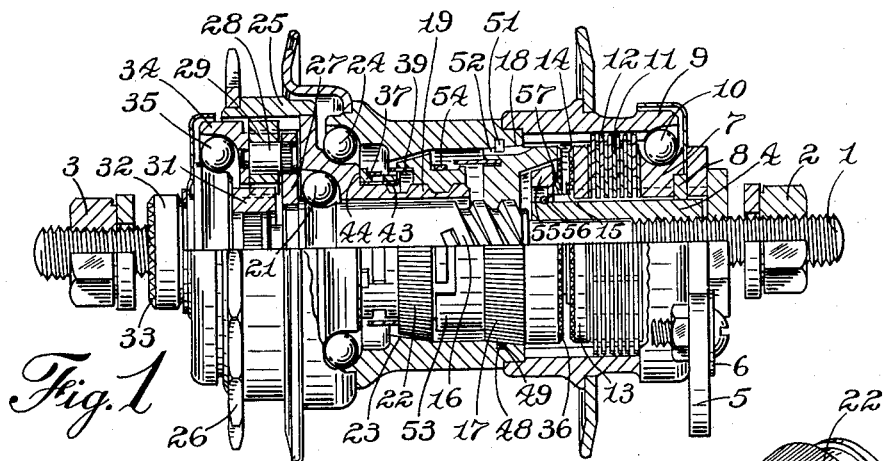
Fig. 1 is a side elevation, partly broken away and in section, of a preferred embodiment of the invention showing the parts in the positions assumed when the device is being operated in low gear.
Fig. 2 is an enlarged detail of the low-speed screw shaft and clutch nut member with associated parts as shown in Fig. 1.
Fig. 3 is an exploded detail view of the high-speed clutch nut with the indexing and selecting means for controlling its engagement with the hub.

In Fig. 1 of the drawing there is illustrated an axle 1 adapted to be clamped in the rear fork of a bicycle by means of the clamp nuts 2 and 3. An anchor sleeve 4 is threaded on the axle and prevented from rotation by means of an anchor arm 5 non-rotatably mounted thereon and which is connected to a frame member of the vehicle by a clip 6. A brake abutment ring 7 is splined on the anchor sleeve 4 seated against a split lock ring 8, and formed with a race for receiving the bearings 10 on which one end of a wheel hub 9 is rotatably mounted. The anchor member 4 and the interior of the wheel hub 9 are formed with splines for slidably receiving the brake discs 11, 12 which are thus alternately splined to the anchor member and hub. A brake compression ring 13 having dentals 14 on one face is also splined on the anchor sleeve 4, being retained thereon by a thrust ring 15.

A low speed screw shaft 16 is journalled on the axle 1 and has threaded thereon a low-speed clutch nut 17 which is formed with a conical clutch surface on its periphery adapted to engage a conforming surface 18 in the interior of the hub 9.

A high speed screw shaft 19 is rotatably mounted on the low-speed screw shaft 16 by means of bearings 21 and has threaded thereon a high speed clutch nut 22 having a conical peripheral clutch surface arranged to engage a conforming surface 23 in the interior of the hub 9. Said hub is rotatably mounted on the high speed screw shaft 19 by means of bearings 24.

A driving member 25 including an orbit gear is fixedly mounted on the end of the screw shaft 19 in any suitable manner and has a sprocket 26 rigidly mounted thereon for actuation by a chain in the conventional manner. A planet carrier ring 27 is rigidly mounted on the end of the low-speed screw shaft 16 and carries a plurality of bearing pins 28 on which are journalled planet pinions 29 which mesh exteriorly with the orbit gear 25 and interiorly with a sun gear 31 fixedly mounted on a bearing cone 32 threaded on the axle 1 and non-rotatably connected to the bicycle fork by means of dentals 33. A bearing race member 34 is arranged to support the outer ends of the bearing pins 28 and is rotatably mounted on the cone 32 by means of bearings 35.

The threads of the screw shafts and clutch nuts are so arranged that forward rotation of the screw shafts causes the clutch nuts to engage and rotate the hub, and backward rotation of the low-speed screw shaft causes the low-speed clutch nut 17 to engage the brake compression ring 13 and thereby compress the brake discs 11, 12 to apply the brake. Backward rotation of the clutch nut 17 at this time is prevented by the engagement of the dentals 36 thereon with the dentals 14 on the non-rotatable brake compression ring 13.

Means under the control of the operator are provided for preventing engagement of the high-speed clutch nut 22 with the hub 9 when it is desired to operate in low gear. For this purpose, an abutment ring 37 (Fig. 3) is journalled on the high-speed screw shaft 19 and provided with a plurality of abutments 38. A selector sleeve 39 having spring arms 41 projecting therefrom equal in number to the projections 38 is fixedly mounted in the high-speed clutch nut 22. The spring arms 41 bear frictionally on the periphery of the abutment ring 37, and engage the abutments 38 when in registry therewith. On the other hand when the abutments 38 are in registry with the spaces 42 between the spring arms 41, the travel of the high-speed clutch nut is not interfered with by the abutment ring 37.

The ring 37 is rotatably mounted on an indexing thimble 43 which is fixedly mounted on the high speed screw shaft 19, the abutment ring being confined between a shoulder 44 on the high speed screw shaft and a flange 45 on said thimble. The thimble 45 has one or more spring pawls 46 which are arranged to engage in ratchet openings 47 in the abutment ring 37, there being twice as many said openings as there are abutments 38 on said ring.

In order to insure traversal of the low-speed clutch nut 17 responsive to rotation of the low-speed screw shaft 16, a spring retarder ring 48 is frictionally mounted in a groove 49 in the interior of the hub and is provided with a tongue 51 engaging in an axial keyway 52 in the periphery of the low-speed clutch nut. In order to insure traversal of the high-speed clutch nut 22, a retarder sleeve 53 is fixedly mounted in the low-speed clutch nut 17 and formed with spring arms 54 bearing frictionally on a cylindrical portion of the high-speed clutch nut.

In order to prevent the low-speed clutch nut 17 from engaging the brake compression ring 13 by the forward rotation of the hub when the low-speed screw shaft is not rotating backwards, an annular blocking member 55 is splined on the anchor sleeve 4, being retained thereon by a lock ring 56. A spring washer 57 reacting against the thrust ring 15 yieldably urges the member 55 against the lock ring 56. Thrust ring 15 seats against shoulders 58 formed by reducing the diameter of the splined section of anchor member 4 adjacent its inner end. The blocking member 55 is formed with a conical periphery adapted to engage a conforming surface in the interior of the low-speed clutch nut 17 and thereafter yieldingly resist its movement toward the brake compression ring 13.

In operation, starting with the parts in the positions of low gear operation as illustrated, forward rotation of the sprocket 26 is transmitted through the orbit gear 25 and planets 29 to the low-speed screw shaft 16, whereby the low-speed clutch nut 17 engages and rotates the hub 9 in low gear. At this time, the high-speed clutch nut 22 is held out of engagement with the hub by engagement of the arms 41 of the sleeve 39 with the abutments 38 on the ring 37 which arrest the travel of nut 22 toward clutching engagement with the hub.

If the operator arrests the rotation of the sprocket 26 and allows the vehicle to coast, the rotation of the hub 9 transmitted through the drag ring 48 will move the low-speed clutch nut 17 to the right on its screw shaft 16 until it engages the annulus 55. Its movement is thereby arrested and engagement with the brake compression ring prevented.

The rotation of the low-speed clutch nut 17 by the hub as above described is transmitted frictionally through the sleeve 53 to the high-speed clutch nut 22 which is accordingly rotated forwardly on its screw shaft. This rotation is transmitted by the spring arms 41 of the sleeve 39 to the abutment ring 37 which is thereby indexed forwardly one step on the indexing thimble 43 where it is retained by the pawls 46. Subsequent forward rotation of the sprocket 26 by the operator therefore finds the abutments 38 of the ring 37 in registry with the spaces 42 of the sleeve 39 whereby the high-speed clutch nut 22 is permitted to engage and drive the hub in high gear.

Shifting from high gear to low gear when desired by the operator is accomplished in the same manner.

When it is desired to apply the brake, backward rotation of the sprocket 26 transmitted through the planetary gearing to the low-speed screw shaft 16 traverses the low-speed clutch nut 17 to the right. Since the backward rotation of the low-speed clutch nut is resisted not only by the drag ring 48, but also by its frictional engagement with the non-rotatable annulus 55, the screw-jack action of the low-speed screw shaft causes nut 17 to overcome the spring 57 and engage the brake compression ring 13, whereby the brake discs are compressed as a function of the backward forces applied by the operator to the sprocket 26.

Although but one form of the invention has been shown and described in detail, it will be understood that changes may be made in the design and arrangement of the parts without departing from the spirit of the invention.

I claim:

1. In a semi-automatic two-speed hub and coaster brake for velocipedes and the like, a fixed axle, a low-speed screw shaft journalled thereon, a driving member and high-speed screw shaft rotatably mounted on the low-speed shaft, reduction gearing connecting the driving member and high-speed screw shaft to the low-speed screw shaft, a hub rotatably mounted on the axle and the high-speed screw shaft, said hub having a pair of internal clutch surfaces, a high-speed clutch nut threaded on the high-speed screw shaft for axial movement into and out of engagement with one of said clutch surfaces, a low-speed clutch nut threaded on the low-speed screw shaft for movement into and out of engagement with the other clutch surface of the hub, means for preventing simultaneous engagement of said clutch nuts with the hub, braking means for the hub actuated by said low-speed clutch nut responsive to backward rotation of the low-speed screw shaft, a continuously operable frictional drag connection from the hub to the low-speed clutch nut, means frictionally transmitting rotation from the low-speed clutch nut to the high-speed clutch nut; and means for opposing actuation of the braking means by the low-speed clutch nut when the low-speed screw shaft is not rotated backwards, but operable to assist such actuation responsive to backward rotation of the low-speed screw shaft.

2. A device as set forth in claim 1 in which the frictional connection from the hub to the low-speed clutch nut is constructed to transmit greater torque than the frictional connection from the low-speed clutch nut to the high-speed clutch nut.

3. A device as set forth in claim 1 in which said opposing means comprises a blocking member in the path of movement of the low-speed clutch nut, and means including a yielding splined connection for non-rotatably mounting said blocking member on the axle.

4. A device as set forth in claim 3 in which said blocking member is formed to frictionally engage the low-speed clutch nut and oppose its rotation in either direction while in engagement therewith.

References Cited in the file of this patent

UNITED STATES PATENTS

| | | |
|---|---|---|
| 2,081,566 | Winkler | May 25, 1937 |
| 2,104,136 | Marden | Jan. 4, 1938 |
| 2,303,041 | Glacy | Nov. 24, 1942 |
| 2,473,177 | Sherwood | June 14, 1949 |
| 2,517,847 | Crossland | Aug. 8, 1950 |
| 2,569,718 | Hooykaas | Oct. 2, 1951 |
| 2,837,187 | Hood | June 3, 1958 |